(12) United States Patent
Yaza

(10) Patent No.: US 10,625,581 B2
(45) Date of Patent: Apr. 21, 2020

(54) VEHICLE LATERAL STRUCTURE

(71) Applicant: TOYOTA JIDOSHA KABUSHIKI KAISHA, Toyota-shi (JP)

(72) Inventor: Atsushi Yaza, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 58 days.

(21) Appl. No.: 16/154,764

(22) Filed: Oct. 9, 2018

(65) Prior Publication Data
US 2019/0176584 A1 Jun. 13, 2019

(30) Foreign Application Priority Data

Dec. 7, 2017 (JP) .................................. 2017-234854

(51) Int. Cl.
*B60J 5/04* (2006.01)
*B62D 25/20* (2006.01)
*B62D 25/02* (2006.01)
*B62D 21/15* (2006.01)

(52) U.S. Cl.
CPC ........... *B60J 5/0412* (2013.01); *B60J 5/0422* (2013.01); *B62D 21/157* (2013.01); *B62D 25/025* (2013.01); *B62D 25/2036* (2013.01)

(58) Field of Classification Search
CPC ...... B60J 5/0412; B60J 5/0422; B62D 21/157; B62D 25/025; B62D 25/2036
See application file for complete search history.

(56) References Cited

U.S. PATENT DOCUMENTS

2019/0184820 A1* 6/2019 Murashige ........... B60K 15/067

FOREIGN PATENT DOCUMENTS

JP 2009-126359 6/2009
WO WO-2016083510 A1 * 6/2016 ............ B60J 5/0427

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle lateral structure includes: a rocker extending in a longitudinal direction of a vehicle; and a side door existing along the rocker in a closed state in which the side door is closed, the side door including a lower region of the side door being located further from a center of the vehicle in a vehicle width direction than the rocker is in the vehicle width direction and a protrusion portion which protrudes toward the center of the vehicle in the vehicle width direction from a lower end portion of the lower region in a vertical direction of the vehicle.

7 Claims, 4 Drawing Sheets

VEHICLE LATERAL STRUCTURE

INCORPORATION BY REFERENCE

The disclosure of Japanese Patent Application No. 2017-234854 filed on Dec. 7, 2017 including the specification, drawings and abstract is incorporated herein by reference in its entirety.

BACKGROUND

1. Technical Field

The disclosure relates to a vehicle lateral structure.

2. Description of Related Art

There is known a vehicle lateral structure that is equipped with a rocker that extends in a longitudinal direction of a vehicle, and a side door that is arranged, in its closed state, along the rocker (e.g., see Japanese Patent Application Publication No. 2009-126359 (JP 2009-126359 A)).

In the vehicle lateral structure of Japanese Patent Application Publication No. 2009-126359 (JP 2009-126359 A), a protrusion portion that protrudes inward in a vehicle width direction is formed at a lower end portion of an inner panel of the side door. A concave portion in which the protrusion portion of the side door is arranged is formed in an upper side of an outer lateral surface portion of the rocker. Thus, in the event of a lateral collision, the protrusion portion of the side door is engaged with the concave portion of the rocker, so the side door can be restrained from entering a cabin.

SUMMARY

However, in the aforementioned vehicle lateral structure, a load concentrates on the upper side of the outer lateral surface portion of the rocker in the event of a lateral collision. Therefore, the rocker may be deformed, and the side door and the rocker may be disengaged from each other. Then, when the side door and the rocker are disengaged from each other, there is a possibility that an effect of restraining the side door from entering the cabin is not exerted.

The disclosure provides a vehicle lateral structure that can suppress failures to exert an effect of restraining a side door from entering a cabin in the event of a lateral collision.

A vehicle lateral structure according to a first aspect of the disclosure includes: a rocker extending in a longitudinal direction of a vehicle; and a side door existing along the rocker in a closed state in which the side door is closed, the side door including a lower region of the side door being located further from a center of the vehicle in a vehicle width direction than the rocker is in the vehicle width direction and a protrusion portion which protrudes toward the center of the vehicle in the vehicle width direction from a lower end portion of the lower region in a vertical direction of the vehicle.

According to the above aspect, the lower region of the side door is engaged with the rocker in the event of a lateral collision, so the side door can be restrained from entering the cabin. Besides, the side door is entirely brought into abutment on the outer lateral surface portion of the rocker. Thus, the area in which a collision load from the side door is input to the rocker is larger than in the case where the side door is locally engaged with the upper side of the outer lateral surface portion of the rocker. Therefore, a collision load that is input to the rocker from the side door can be scattered. Thus, the rocker can be restrained from being deformed, so the side door and the rocker can be restrained from being disengaged from each other.

In the above aspect, a lower end of the side door may be located below the rocker in the vertical direction of the vehicle.

In the above aspect, the lower region may be a region of the side door located between an upper end of the rocker and a lower end of the rocker in the vertical direction of the vehicle.

In the above aspect, the vehicle lateral structure may further include a reinforcing member located in the lower region.

The reinforcing member may extend in the vertical direction of the vehicle.

According to the above aspect, in the case where the lower region of the side door is engaged with the rocker in the event of a lateral collision, the lower region of the side door can be restrained from being deformed, so the side door and the rocker can be restrained from being disengaged from each other.

In the above aspect, a first end portion which is one end portion of the reinforcing member may be located above a centroid of the rocker, and a second end portion which is the other end portion of the reinforcing member may be located closer to the center of the vehicle in the vehicle width direction than a lateral portion of the rocker facing outside in the vehicle width direction is.

In the above aspect, the first end portion may be an upper end of the reinforcing member in the vertical direction of the vehicle, and the second end portion may be a lower end of the reinforcing member in the vertical direction of the vehicle.

According to the above aspect, the lower region of the side door can be appropriately reinforced by the reinforcing member.

The vehicle lateral structure according to the disclosure can suppress failures to exert the effect of restraining the side door from entering the cabin in the event of a lateral collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One of the embodiments of the disclosure will be described hereinafter based on the drawings.

First of all, a vehicle 100 to which a vehicle lateral structure 50 according to one of the embodiments of the disclosure is applied will be described with reference to FIG. 1.

Figure 1:
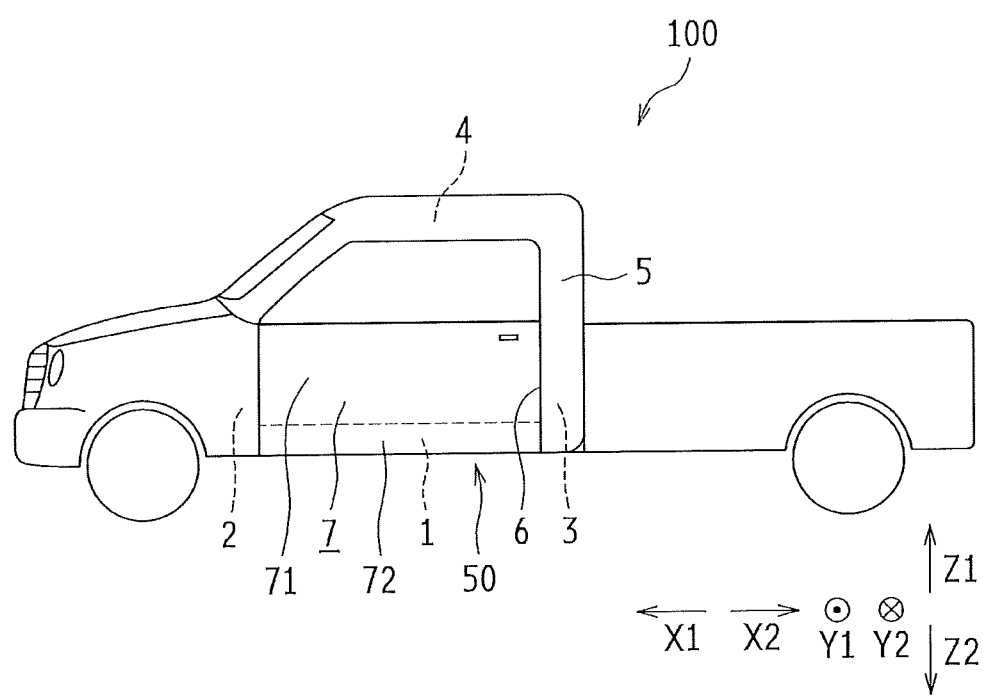
FIG. 1 is a lateral view showing a vehicle to which a vehicle lateral structure according to one of the embodiments is applied.

As shown in FIG. 1, the vehicle 100 is, for example, a pickup truck, and is provided with rockers 1 that extend in a longitudinal direction of the vehicle (X1 and X2 directions). A pair of the right and left rockers 1 are arranged at a lower portion of the vehicle, and are provided at both end portions in a vehicle width direction (Y1 and Y2 directions) respectively. An A-pillar 2 is provided at a vehicle front-side end portion (the X1 direction side) of each of the rockers 1, and a B-pillar 3 is provided at a vehicle rear-side end portion (the X2 direction side) of each of the rockers 1. The A-pillar 2 and the B-pillar 3 are formed in such a manner as to extend upward (toward a Z1 direction) from each of the rockers 1. Upper end portions of the A-pillar 2 and the B-pillar 3 are coupled to each other by a roof side rail 4 that extends in the longitudinal direction of the vehicle. Each of the rockers 1, the A-pillar 2, the B-pillar 3 and the roof side rail 4 constitute part of a vehicle body skeleton, and are covered with a side member outer panel 5 that constitutes an outer plate of the vehicle 100.

Besides, each lateral portion of the vehicle 100 has a door opening portion 6 formed therein, and is provided with a side door 7 that opens/closes the door opening portion 6. A front end portion of the side door 7 is coupled to the A-pillar 2 via a hinge (not shown). This side door 7 includes a door body 71 that is formed of a door outer panel and a door inner panel. The door body 71 is formed in the shape of a box. A window regulator (not shown), an impact beam (not shown) and the like are accommodated in an inner space S (see FIG. 2) of the door body 71.

—Vehicle Lateral Structure—

Next, the vehicle lateral structure 50 according to the present embodiment will be described with reference to FIG. 2.

Figure 2:
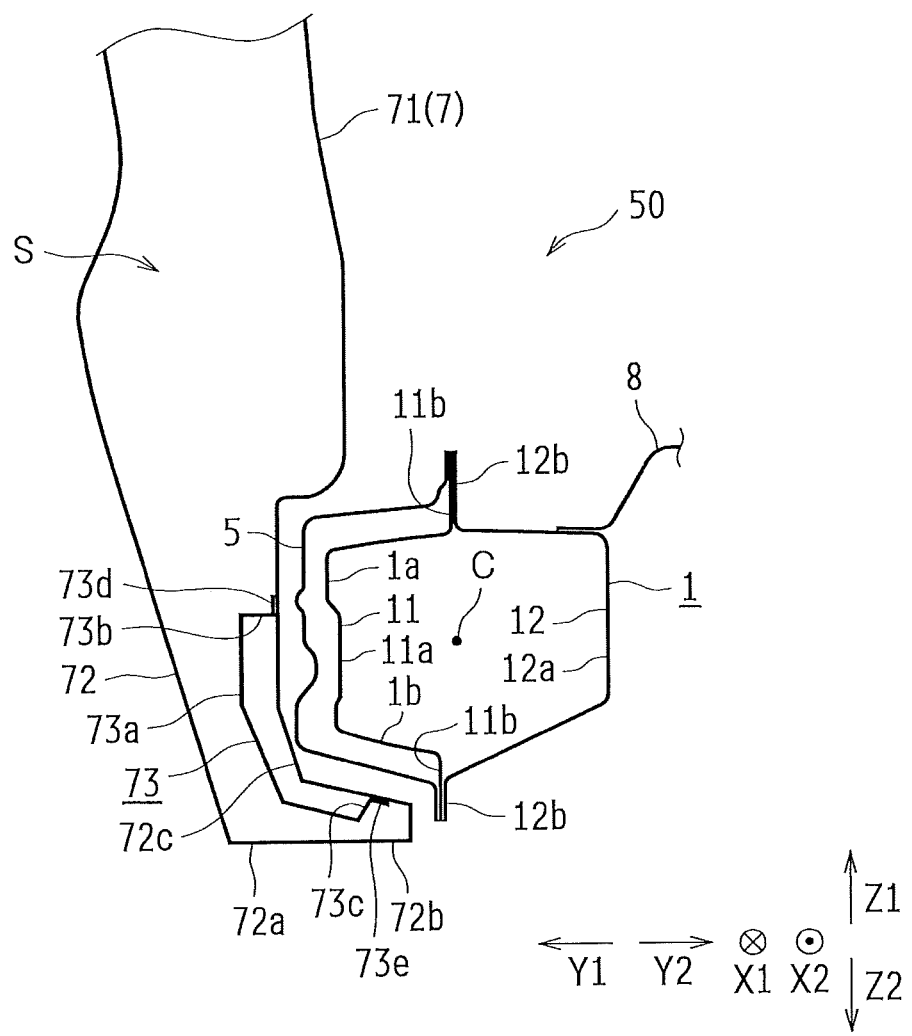
FIG. 2 is a schematic cross-sectional view for illustrating the vehicle lateral structure according to the present embodiment.

As shown in FIG. 2, the vehicle lateral structure 50 is equipped with the rocker 1 that extends in the longitudinal direction of the vehicle, and the side door 7 that is arranged, in its closed state in which the door is closed, along the rocker 1. Incidentally, the direction of the side door 7 in the following description refers to a direction in a state where the side door 7 closes the door opening portion 6 (see FIG. 1).

The rocker 1 includes a rocker outer panel 11 and a rocker inner panel 12. A closed cross-section is formed by joining the rocker outer panel 11 and the rocker inner panel 12 to each other.

The rocker outer panel 11 has a body portion 11a whose cross-section is formed substantially in the shape of U, and flange portions 11b that extend from open ends of the body portion 11a in such a manner as to be spaced apart from each other. The rocker inner panel 12 has a body portion 12a whose cross-section is formed substantially in the shape of U, and flange portions 12b that extend from open ends of the body portion 12a in such a manner as to be spaced apart from each other. The body portion 11a of the rocker outer panel 11 is arranged such that the open ends thereof are directed inward in the vehicle width direction (toward the Y2 direction), and the body portion 12a of the rocker inner panel 12 is arranged such that the open ends thereof are directed outward in the vehicle width direction (toward the Y1 direction). Also, the flange portions 11b of the rocker outer panel 11 and the flange portions 12b of the rocker inner panel 12 are joined to each other respectively.

The side member outer panel 5 is provided outside the rocker outer panel 11 in the vehicle width direction. An outer end portion of a floor panel 8 in the vehicle width direction is coupled to the rocker inner panel 12.

A lower region 72 of the door body 71 of the side door 7 is arranged outside the rocker 1 in the vehicle width direction, and a lower end portion 72a of the lower region 72 (the side door 7) is arranged below the rocker 1 (in a Z2 direction). A protrusion portion 72b that protrudes inward in the vehicle width direction (toward the rocker 1) is formed at the lower end portion 72a of the lower region 72. That is, the lower region 72 is formed with a substantially L-shaped cross-section, and is configured to cover an outer lateral surface portion (lateral portion) 1a of the rocker 1 from outside in the vehicle width direction and cover an outer lower surface portion 1b of the rocker 1 from below.

An inner lateral surface portion 72c of the lower region 72 is formed with a substantially L-shaped cross-section, and is formed along the outer lateral surface portion 1a of the rocker 1 and the lower surface portion 1b of the rocker 1. This inner lateral surface portion 72c is arranged apart from the outer lateral surface portion 1a of the rocker 1 and the lower surface portion 1b of the rocker 1 by a predetermined distance, and is provided with a reinforcement 73. Incidentally, the reinforcement 73 is an example of "the reinforcing member" according to the disclosure.

The reinforcement 73 is provided to reinforce the inner lateral surface portion 72c of the lower region 72. This reinforcement 73 is a reinforcing plate provided along the inner lateral surface portion 72c. That is, the reinforcement 73 extends in the vertical direction of the vehicle. The reinforcement 73 is arranged in the inner space S of the door body 71. In concrete terms, the reinforcement 73 has a body portion 73a, arm portions 73b and 73c, and flange portions 73d and 73e.

The body portion 73a is formed with a substantially L-shaped cross-section. This body portion 73a is formed along the inner lateral surface portion 72c, and is arranged apart from the inner lateral surface portion 72c by a predetermined distance. Besides, the body portion 73a has a first surface portion that extends vertically, a second surface portion that is inclined inward in the vehicle width direction from a lower end portion of the first surface portion, and a third surface portion that is further inclined inward in the vehicle width direction from a lower end portion of the second surface portion.

The arm portion 73b is formed in such a manner as to extend toward the inner lateral surface portion 72c from an upper end portion of the body portion 73a. The arm portion 73c is formed in such a manner as to extend toward the inner lateral surface portion 72c from an inner end portion of the body portion 73a in the vehicle width direction (a lower end portion thereof). The flange portion 73d is formed in such a manner as to extend upward from the arm portion 73b, and is formed along the inner lateral surface portion 72c. The flange portion 73e is formed in such a manner as to extend diagonally downward and inward in the vehicle width direction from the arm portion 73c, and is formed along the inner lateral surface portion 72c. The flange portions 73d and 73e are joined to the inner lateral surface portion 72c.

An upper end portion of the reinforcement 73 (a tip of the flange portion 73d) is arranged above a centroid C of the rocker 1 (in the Z1 direction). An inner end portion of the reinforcement 73 in the vehicle width direction (a tip of the flange portion 73e) is arranged inside the outer lateral surface portion 1a of the rocker 1 in the vehicle width direction. Incidentally, the upper end portion of the reinforcement 73 is an example of "first end portion" according to the disclosure, and the inner end portion of the reinforcement 73 in the vehicle width direction is an example of "second end portion" according to the disclosure.

Besides, the reinforcement 73 is formed in such a manner as to extend in the longitudinal direction of the vehicle. For example, the reinforcement 73 is provided substantially over the entire length of the side door 7 in the longitudinal direction of the vehicle.

—Operation Example in Event of Lateral Collision—

Next, an operation example of the vehicle lateral structure 50 according to the present embodiment in the event of a lateral collision will be described with reference to FIG. 3.

Figure 3:
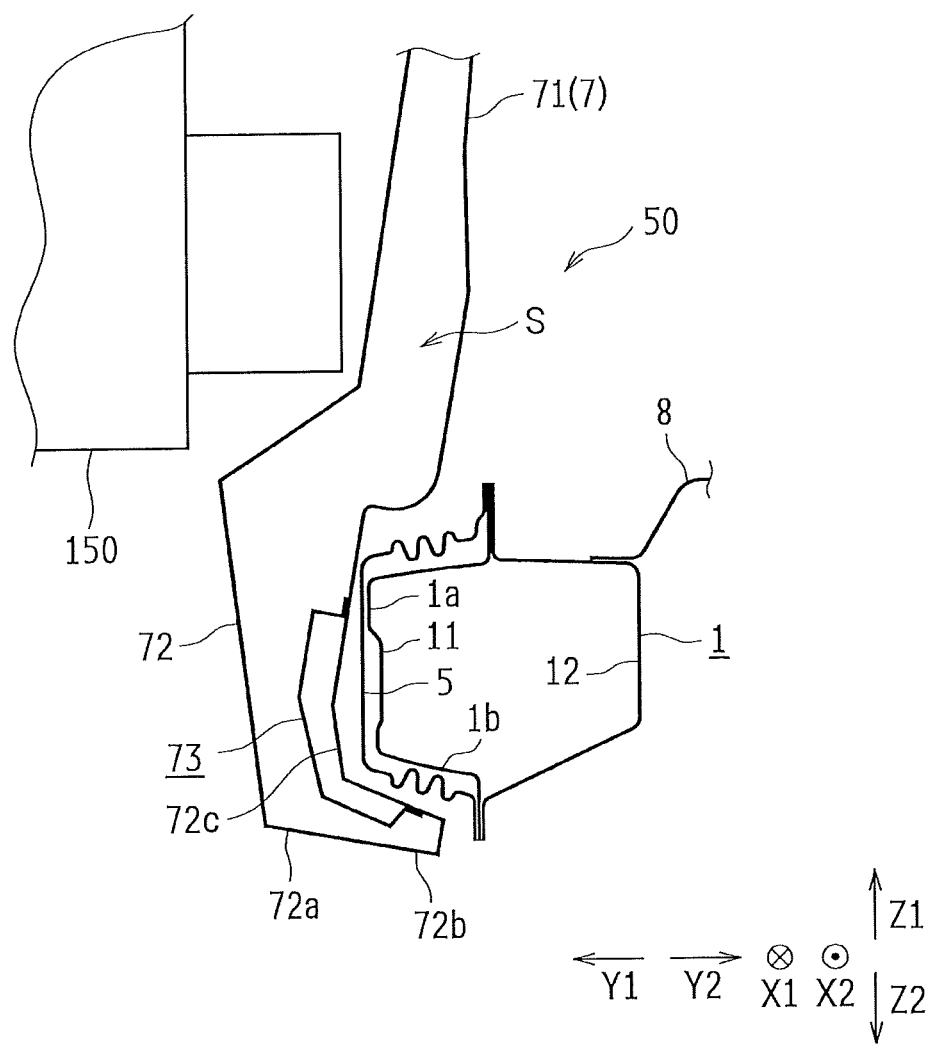
FIG. 3 is a schematic cross-sectional view for illustrating an operation example of the vehicle lateral structure according to the present embodiment in the event of a lateral collision.

As shown in FIG. 3, in the case where a moving deformable barrier (an MDB) 150 modeled after the vehicle undergoes a lateral collision, the side door 7 is pressed inward in the vehicle width direction (toward the Y2 direction) by the MDB 150 in the vehicle lateral structure 50. At this time, the lower region 72 of the door body 71 is engaged with the rocker 1. That is, the inner lateral surface portion 72c of the lower region 72 is brought into abutment on the outer lateral surface portion 1a of the rocker 1 and the lower surface portion 1b of the rocker 1 via the side member outer panel 5. That is, a collision load that is transmitted from the side door 7 to the rocker 1 is input via the outer lateral surface portion 1a of the rocker 1 and the lower surface portion 1b of the rocker 1. Thus, the side door 7 is restrained from entering a cabin (not shown).

—Effect—

In the present embodiment, as described above, the lower region 72 of the side door 7 is arranged outside the rocker 1 in the vehicle width direction, the lower end portion 72a of the lower region 72 is arranged below the rocker 1, and the protrusion portion 72b that protrudes inward in the vehicle width direction from the lower end portion 72a is formed. Owing to this configuration, in the event of a lateral collision, the lower region 72 of the side door 7 is engaged with the rocker 1, so the side door 7 can be restrained from entering the cabin. Besides, the side door 7 is entirely brought into abutment on the outer lateral surface portion 1a of the rocker 1, so the area in which a collision load from the side door 7 is input to the rocker 1 is larger than in the case where the side door is locally engaged with the upper side of the outer lateral surface portion 1a of the rocker 1. Therefore, the collision load that is input to the rocker 1 from the side door 7 can be scattered. Thus, the rocker 1 can be restrained from being deformed, so the side door 7 and the rocker 1 can be restrained from being disengaged from each other. As a result, failures to exert an effect of restraining the side door 7 from entering the cabin in the event of a lateral collision can be suppressed.

Besides, in the present embodiment, the inner lateral surface portion 72c of the lower region 72 of the side door 7 is provided with the reinforcement 73. Thus, in the case where the lower region 72 of the side door 7 is engaged with the rocker 1 in the event of a lateral collision, the inner lateral surface portion 72c can be restrained from being deformed. Therefore, the side door 7 and the rocker 1 can be restrained from being disengaged from each other.

Besides, in the present embodiment, the upper end portion of the reinforcement 73 is arranged above the centroid C of the rocker 1, and the inner end portion of the reinforcement 73 in the vehicle width direction is arranged inside the outer lateral surface portion 1a of the rocker 1 in the vehicle width direction. Thus, the inner lateral surface portion 72c of the side door 7 can be appropriately reinforced by the reinforcement 73.

—Other Embodiments—

Incidentally, the embodiment disclosed herein is exemplary in every respect and does not constitute any ground for restrictive interpretation. Accordingly, the technical scope of the disclosure is not interpreted by the aforementioned embodiment alone, but is defined based on the description of the claims. Besides, the technical scope of the disclosure encompasses all the alterations that are equivalent in significance and scope to the claims.

For example, in the aforementioned embodiment, the example in which the disclosure is applied to the vehicle lateral structure 50 of the vehicle 100 as a pickup truck has been presented, but the disclosure is not limited thereto. The disclosure may be applied to a vehicle lateral structure of a vehicle other than a pickup truck.

Besides, in the aforementioned embodiment, the example in which the side door 7 is a hinge-type door has been presented, but the disclosure is not limited thereto. The side door may be a sliding-type door.

Besides, in the aforementioned embodiment, the example in which the protrusion portion 72b extends horizontally from the lower end portion 72a of the lower region 72 (the side door 7) has been presented, but the disclosure is not limited there to. The protrusion portion 72b may extend such that an open end of the protrusion portion 72b is located below the lower end portion 72a.

Besides, in the aforementioned embodiment, the example in which the reinforcement 73 is provided on the inner lateral surface portion 72c of the lower region 72 has been presented, but the disclosure is not limited thereto. The reinforcement may not be provided.

Figure 4:
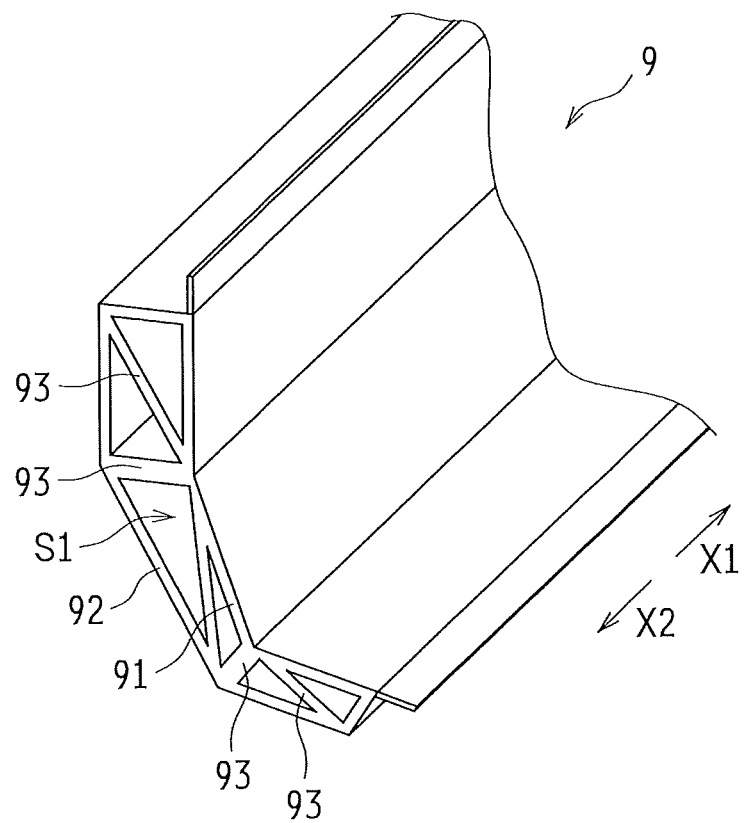
FIG. 4 is a perspective view showing a reinforcement according to a modification example of the present embodiment.

Besides, in the aforementioned embodiment, the example in which the reinforcement 73 is a plate (a plate material) has been presented, but the disclosure is not limited thereto. The reinforcement may be an extruded material made of an aluminum alloy. For example, as shown in FIG. 4, a reinforcement 9 according to a modification example may be equipped with a pair of plates 91 and 92 that form a space S1, and a plurality of partitions (ribs) 93 that separate the space S1. Incidentally, the reinforcement 9 is an example of "the reinforcing member" according to the disclosure.

Besides, in the aforementioned embodiment, the example in which the reinforcement 73 is provided substantially over the entire length of the side door 7 in the longitudinal direction of the vehicle has been presented, but the disclosure is not limited thereto. The reinforcement may be provided along a part of the side door in the longitudinal direction of the vehicle. Besides, a plurality of reinforcements that are spaced apart from one another may be provided along the side door in the longitudinal direction of the vehicle.

Besides, in the aforementioned embodiment, the example in which the reinforcement 73 is attached to the inner lateral surface portion 72c by joining the flange portions 73d and 73e to the inner lateral surface portion 72c has been presented, but the disclosure is not limited thereto. The reinforcement may be attached to the inner lateral surface portion in any manner. For example, the reinforcement may not be provided with any arm portion or any flange portion, and the body portion of the reinforcement may be directly joined to the inner lateral surface portion.

Besides, in the aforementioned embodiment, the example in which the upper end portion of the reinforcement 73 is arranged above the centroid C of the rocker 1 has been presented, but the disclosure is not limited thereto. The upper end portion of the reinforcement may be arranged below the centroid of the rocker.

Besides, in the aforementioned embodiment, the example in which the upper end portion of the reinforcement 73 is arranged below the upper surface of the rocker 1 has been presented, but the disclosure is not limited thereto. The upper end portion of the reinforcement may be arranged above the upper surface of the rocker 1.

Besides, in the aforementioned embodiment, the example in which the inner end portion of the reinforcement 73 in the vehicle width direction is arranged inside the outer lateral surface portion 1*a* of the rocker 1 in the vehicle width direction has been presented, but the disclosure is not limited thereto. The inner end portion of the reinforcement in the vehicle width direction may be arranged outside the outer lateral surface portion of the rocker in the vehicle width direction.

The disclosure is applicable to a vehicle lateral structure that is equipped with a rocker that extends in a longitudinal direction of a vehicle, and a side door that is arranged, in its closed state, along the rocker.

What is claimed is:

1. A vehicle lateral structure comprising:
    a rocker extending in a longitudinal direction of a vehicle; and
    a side door existing along the rocker in a closed state in which the side door is closed, the side door including
        a lower region of the side door being located further from a center of the vehicle in a vehicle width direction than the rocker is in the vehicle width direction and
        a protrusion portion which protrudes toward the center of the vehicle in the vehicle width direction from a lower end portion of the lower region in a vertical direction of the vehicle.

2. The vehicle lateral structure according to claim 1, wherein a lower end of the side door is located below the rocker in the vertical direction of the vehicle.

3. The vehicle lateral structure according to claim 1, wherein the lower region is a region of the side door located between an upper end of the rocker and a lower end of the rocker in the vertical direction of the vehicle.

4. The vehicle lateral structure according to claim 1, further comprising a reinforcing member located in the lower region.

5. The vehicle lateral structure according to claim 4, wherein the reinforcing member extends in the vertical direction of the vehicle.

6. The vehicle lateral structure according to claim 4, wherein
    a first end portion which is one end portion of the reinforcing member is located above a centroid of the rocker, and
    a second end portion which is the other end portion of the reinforcing member is located closer to the center of the vehicle in the vehicle width direction than a lateral portion of the rocker facing outside in the vehicle width direction is.

7. The vehicle lateral structure according to claim 6, wherein
    the first end portion is an upper end of the reinforcing member in the vertical direction of the vehicle, and
    the second end portion is a lower end of the reinforcing member in the vertical direction of the vehicle.

* * * * *